(12) United States Patent
Liu et al.

(10) Patent No.: US 7,163,241 B2
(45) Date of Patent: Jan. 16, 2007

(54) VEHICLE BUMPER BEAM HAVING NON-UNIFORM CROSS SECTIONS

(75) Inventors: Bing Liu, Woodbridge (CA); Murray Richard Mason, Bolton (CA); Ryszard Adam Zajac, Cookstown (CA)

(73) Assignee: F.tech R&D North America Inc., Troy (US)

( * ) Notice: Subject to any disclaimer, the term of this patent is extended or adjusted under 35 U.S.C. 154(b) by 117 days.

(21) Appl. No.: 10/875,264

(22) Filed: Jun. 25, 2004

(65) Prior Publication Data

US 2005/0285414 A1    Dec. 29, 2005

(51) Int. Cl.
*B60R 27/00* (2006.01)
(52) U.S. Cl. .................. 293/102; 293/120; 293/121
(58) Field of Classification Search ............. 293/102, 293/120, 121
See application file for complete search history.

(56) References Cited

U.S. PATENT DOCUMENTS

| | | | |
|---|---|---|---|
| 4,829,803 A | 5/1989 | Cudini | |
| 5,080,410 A * | 1/1992 | Stewart et al. | 293/102 |
| 5,803,517 A * | 9/1998 | Shibuya | 293/120 |
| 5,997,058 A | 12/1999 | Pedersen | |
| 6,349,521 B1 * | 2/2002 | McKeon et al. | 293/102 |
| 6,352,297 B1 | 3/2002 | Sundren et al. | |
| 6,467,831 B1 | 10/2002 | Mori et al. | |
| 6,540,276 B1 | 4/2003 | Azuchi et al. | |
| 6,588,084 B1 | 7/2003 | Dudziak | |
| 6,663,150 B1 | 12/2003 | Evans | |
| 6,684,505 B1 | 2/2004 | Sundgren et al. | |
| 2002/0180222 A1 * | 12/2002 | Janssen | 293/102 |
| 2004/0080167 A1 * | 4/2004 | Malteste et al. | 293/102 |
| 2004/0135384 A1 * | 7/2004 | Pritchard et al. | 293/120 |

* cited by examiner

*Primary Examiner*—Lori L. Coletta
(74) *Attorney, Agent, or Firm*—Bereskin & Parr

(57) ABSTRACT

A bumper for a vehicle comprises a hollow tubular beam, and has two side rail mounting portions and a front impact portion disposed between and formed continuously with the side rail mounting portions. The front impact portion includes an initial impact region and two additional deforming regions, with the initial impact region being disposed between the additional deforming regions. The initial impact region has top and bottom surfaces that are generally flat and the additional deforming regions each have top and bottom surfaces that are generally convex.

26 Claims, 5 Drawing Sheets

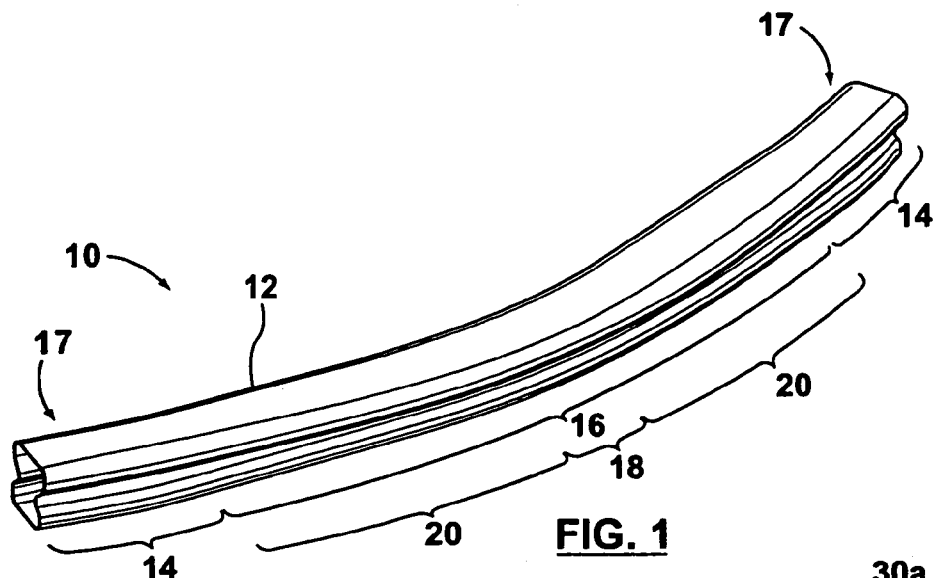
FIG. 1
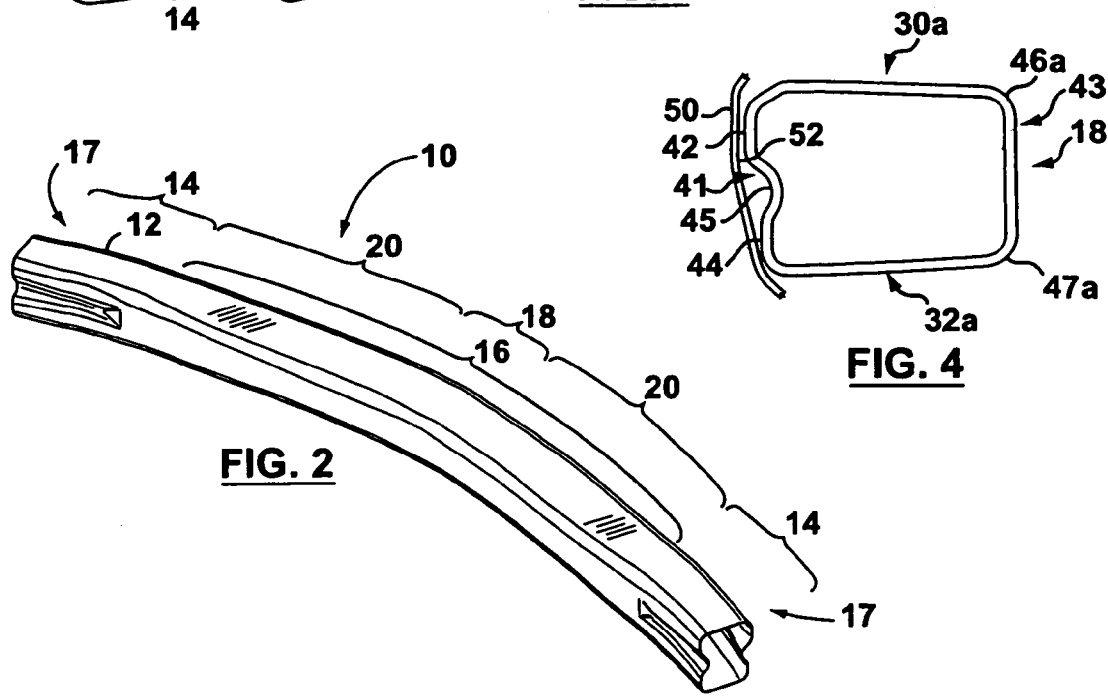
FIG. 2
FIG. 4
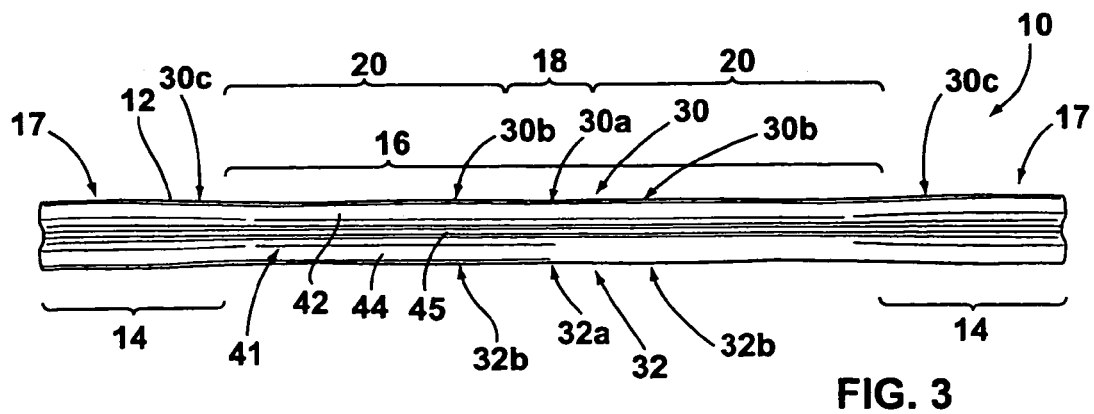
FIG. 3

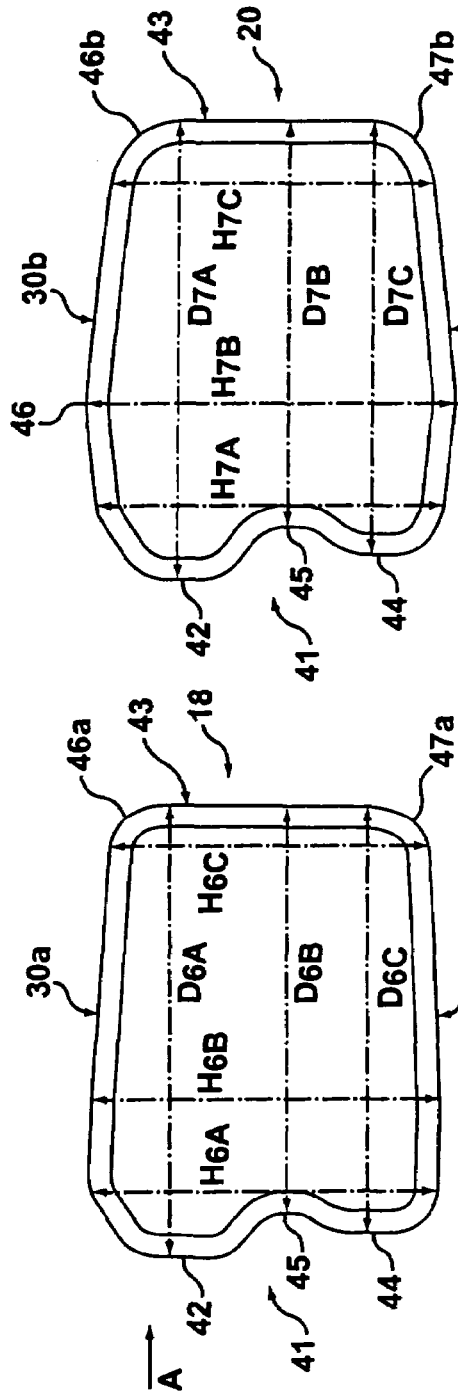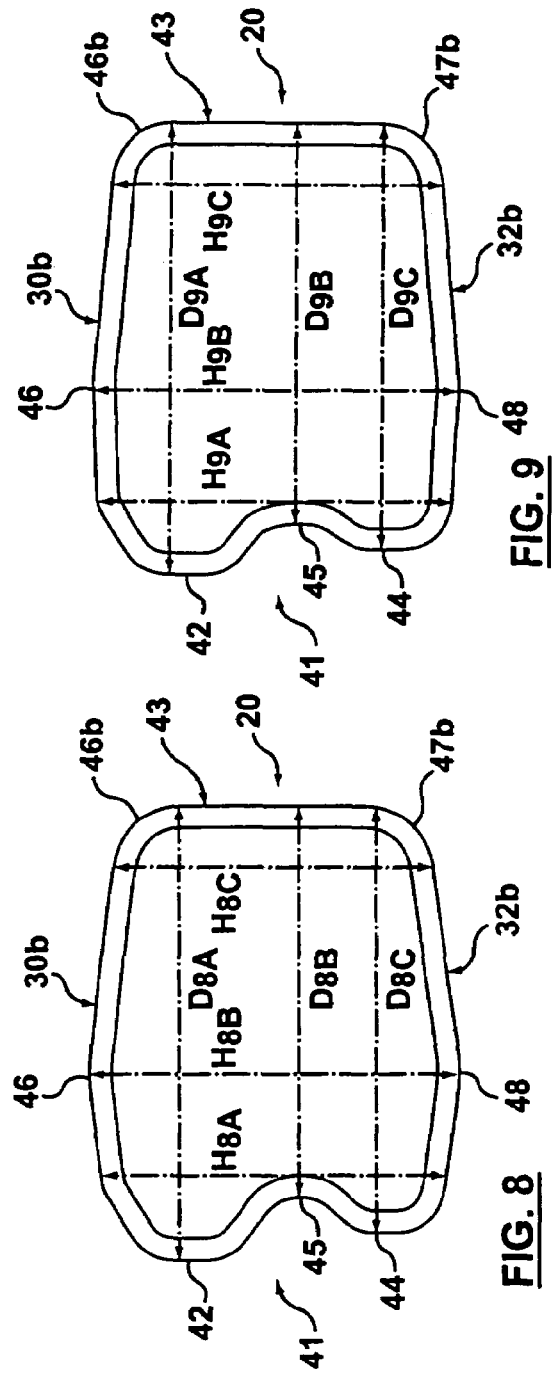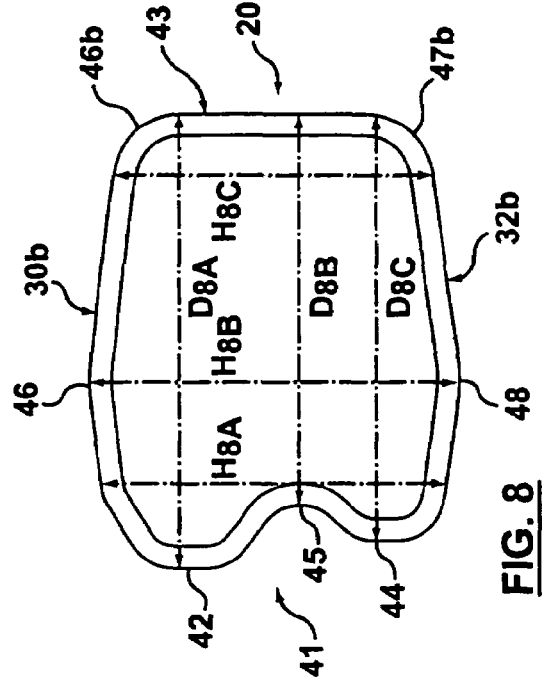

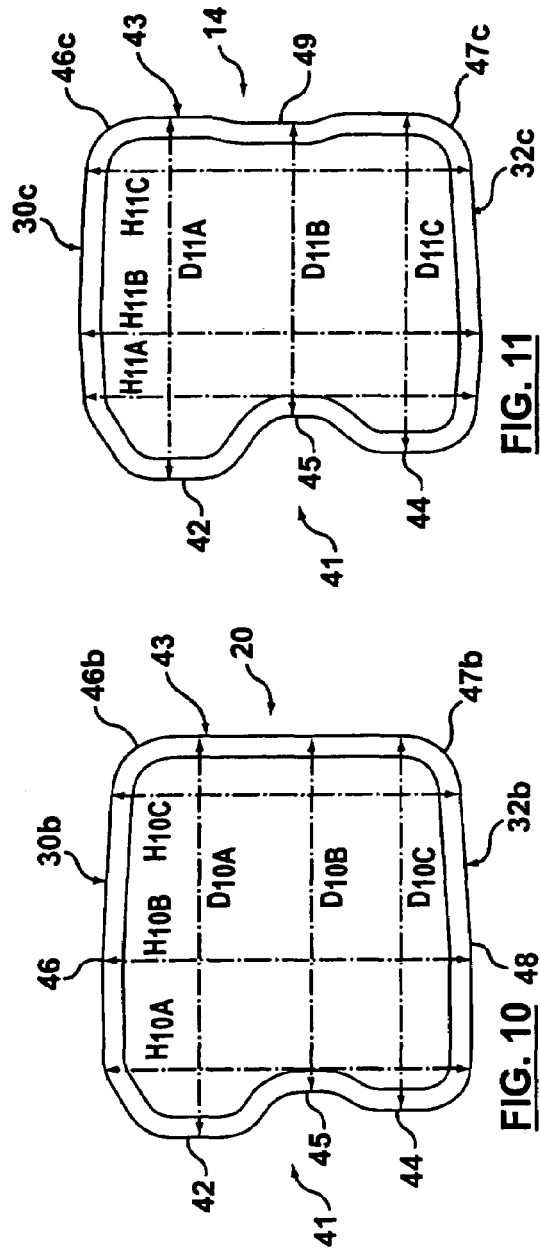
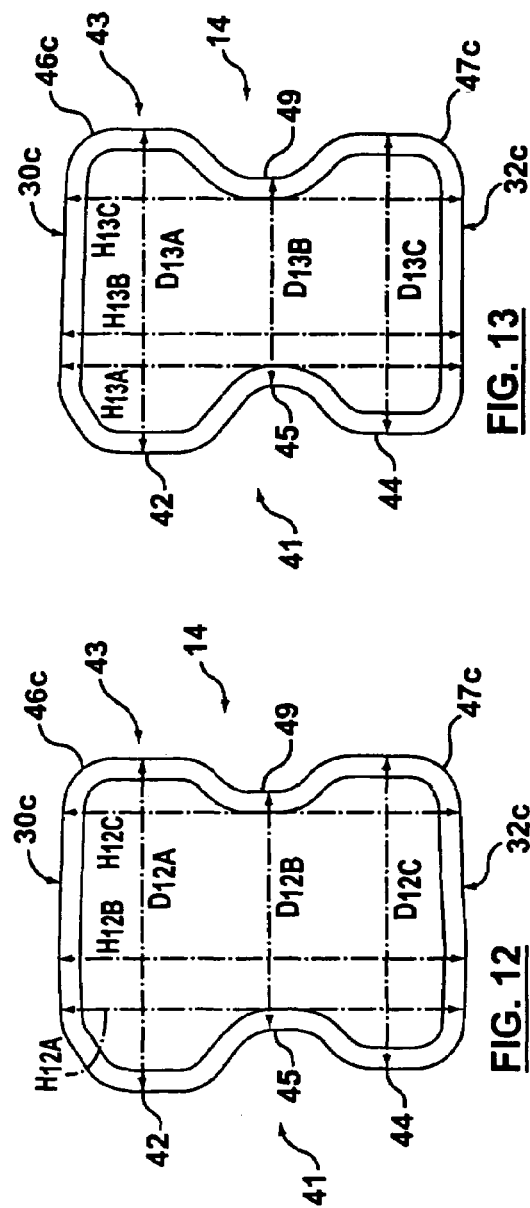

VEHICLE BUMPER BEAM HAVING NON-UNIFORM CROSS SECTIONS

FIELD OF THE INVENTION

The present invention relates generally to bumper beams for motor vehicles, and in particular to a hollow tubular bumper beam for a motor vehicle.

BACKGROUND OF THE INVENTION

Motor vehicles typically include a bumper and a fascia, i.e. a covering placed over the bumper to improve the vehicle's appearance and/or aerodynamics. Vehicle bumpers are designed to absorb the energy of a low speed collision so as to avoid damage to the rest of the vehicle. Thus, in the event of such a collision, only the bumper and the fascia would need to be replaced, thereby lowering repair costs. Space between the fascia and the bumper is typically filled with foam.

In a low speed collision, for example at 5 miles per hour, a bumper will be expected to absorb a given amount of energy. The amount of energy (e) to be absorbed will be defined by the mass (m) and speed (v) of the vehicle, according to the formula $e=(0.5)(m)(v^2)$. Thus, in a test of a given vehicle at a given speed, the energy to be absorbed (in bringing the vehicle to a stop) will be constant. The energy absorbed by a bumper is a function of the "stroke" (s), which is the distance the vehicle continues to move after contacting the test barrier before coming to a stop, and the force (F) applied in stopping the vehicle, according to the formula $e=(F)(s)$. Therefore, a higher force and lower stroke may correspond to the same energy absorption as a lower force and a higher stroke. However, if the force is too great, excess energy will be transferred to the vehicle frame, resulting in damage thereto, and if the stroke is too great, there may be damage to portions of the vehicle other than the bumper. Thus, force and stroke must be balanced, and vehicle manufacturers set standards for both stroke and force for a given vehicle. These requirements are referred to herein as "performance requirements".

One factor that can influence a bumper's performance is the area moment of inertia ($I_A$) at various points along the bumper beam. The area moment of inertia is a measure of a structural member's stiffness and strength. For a given amount of a particular type of material, the area moment of inertia at a given position is a function of the cross-sectional shape of the structure at that point. For a force applied perpendicularly to a face of a solid rectangular section, $I_A=(a^3 \times b)/12$ where a is the depth of the rectangle in the direction in which the force is applied, and b is the height of the rectangle in a direction perpendicular to the application of the force. For a solid cylinder, $I_A=(\pi \times r^4)/4$ where r is the radius, and for a hollow cylinder $I_A=(\pi \times (a^4-b^4))/4$, where a is the radius of the outer surface and b is the radius of the inner surface. For more complicated shapes, the calculations are more complex. A higher area moment of inertia corresponds to a greater resistance to bending.

In addition to meeting performance requirements, a bumper must also meet "layout requirements". In other words, a bumper must be able to be securely mounted to the side rails of a vehicle, and the location and configuration of the side rails may vary from vehicle to vehicle. Furthermore, there will be limits imposed on the dimensions of the bumper, as it will be required to fit between the ends of the side rails and behind and under the vehicle fascia. In addition, a vehicle manufacturer may set weight requirements and cost requirements for a bumper.

Traditionally, bumpers have been manufactured by roll forming, i.e. metal forming by using contoured rolls. When the roll forming process is used to form a bumper, sheet metal is bent into the desired shape, and the longitudinal edge is then welded together. Bumpers made by the roll-forming process are formed from a continuous sheet of metal, and will emerge from the manufacturing process as a continuous, usually curved, tube that is then cut into segments of appropriate size. Therefore, when roll forming is used to produce a bumper, it typically results in a constant radius of curvature for the bumper as a whole. In other words, the radius of curvature of a notional centroid path through the tube will be constant, where the notional centroid path is defined as a path upon which any center point of a vertical cross section taken at any position on the bumper element will lie. In addition, roll forming alone generally produces a bumper having a constant cross-section, in the absence of further manufacturing steps. Having such a constant radius of curvature and constant cross section imposes limitations on the design of the bumper. As a result, roll formed bumpers do not always have the design flexibility needed to adjust to the performance requirements and/or layout requirements of modern motor vehicles.

U.S. Pat. No. 6,349,521 to McKeon et al. discloses a hydroformed bumper beam having a non-constant cross-section in that the front and rear walls comprise arcuate center sections having different radii. This type of construction is said to produce a bumper beam having a high energy absorbing but flexible center section.

However, there remains a need for a bumper beam having an impact region shaped to optimize the ability of the bumper to absorb energy in low speed collisions without causing structural damage to the vehicle.

SUMMARY OF THE INVENTION

In one aspect, the present invention is directed toward a vehicle bumper comprising a longitudinally curved hollow tubular beam. The beam has two side rail mounting portions and a front impact portion disposed between and formed continuously with the side rail mounting portions. The front impact portion includes an initial impact region and two additional deforming regions, with the initial impact region being disposed between the additional deforming regions. The initial impact region has top and bottom surfaces that are generally flat and the additional deforming regions each have top and bottom surfaces that are generally convex.

The top surface of the initial impact region and the top surfaces of the additional deforming regions preferably each comprise regions of a single continuous top surface of the front impact portion, and the bottom surface of the initial impact region and the bottom surfaces of the additional deforming regions preferably each comprise regions of a single continuous bottom surface of the front impact portion. The top and bottom surfaces of the front impact portion preferably taper gradually from being generally flat in the initial impact region to being generally convex in the additional deforming regions. The bumper may have a front surface that includes a stiffening channel extending along at least the front impact portion of the front surface.

The initial impact region of the bumper has a minimum area moment of inertia relative to the direction of impact, and the additional deforming regions each have a maximum area moment of inertia relative to the direction of impact, with the minimum area moment of inertia of the initial impact region being greater than the maximum area moment of inertia of each additional deforming region.

In a preferred embodiment, the beam of the bumper has a notional centroid path therethrough which has a center point, and the front impact portion has an area moment of inertia relative to the direction of impact that has a maximum at a position corresponding to the center point and a minimum at the ends of the additional deforming regions adjacent the side rail mounting portions, with the area moment of inertia generally continuously decreasing from the position corresponding to the center point to the two ends of the additional deforming regions.

The beam of the bumper is preferably composed of ultra high strength steel, and preferably has an exterior surface having a constant perimeter. The notional centroid path through the tubular beam may have a non-constant radius of curvature in the direction of impact.

In another aspect, the present invention is directed towards a bumper for a vehicle comprising a longitudinally symmetrical, longitudinally curved hollow tubular beam having first and second ends and having a top surface and a bottom surface. The top surface and the bottom surface each have a generally flat region disposed in a central portion of the bumper, relative to the first and second ends. The top surface and the bottom surface also each have a first generally convex region disposed between the first end and the central portion, and a second generally convex region disposed between the second end and the central portion. The first and second generally convex regions on the top surface may gradually taper into the generally flat region on the top surface, and the first and second generally convex regions on the bottom surface may gradually taper into the generally flat region on the bottom surface.

BRIEF DESCRIPTION OF THE DRAWINGS

FIG. 1 is a front perspective view of an embodiment of a bumper according to the present invention.

FIG. 2 is a rear perspective view of an embodiment of a bumper according to the present invention.

FIG. 3 is a front view of an embodiment of a bumper according to the present invention.

FIG. 4 is a cross section of taken at a center point of an embodiment of a bumper according to the present invention and aligned with a cross section of a vehicle fascia.

FIG. 6 is a cross section of an embodiment of a bumper according to the present invention, taken along the line 6—6 in FIG. 5.

FIG. 7 is a cross section of an embodiment of a bumper according to the present invention, taken along the line 7—7 in FIG. 5.

FIG. 8 is a cross section of an embodiment of a bumper according to the present invention, taken along the line 8—8 in FIG. 5.

FIG. 9 is a cross section of an embodiment of a bumper according to the present invention, taken along the line 9—9 in FIG. 5.

FIG. 10 is a cross section of an embodiment of a bumper according to the present invention, taken along the line 10—10 in FIG. 5.

FIG. 11 is a cross section of an embodiment of a bumper according to the present invention, taken along the line 11—11 in FIG. 5.

FIG. 12 is a cross section of an embodiment of a bumper according to the present invention, taken along the line 12—12 in FIG. 5.

FIG. 13 is a view of an end of an embodiment of a bumper according to the present invention.

DETAILED DESCRIPTION OF THE INVENTION

Figure 5:
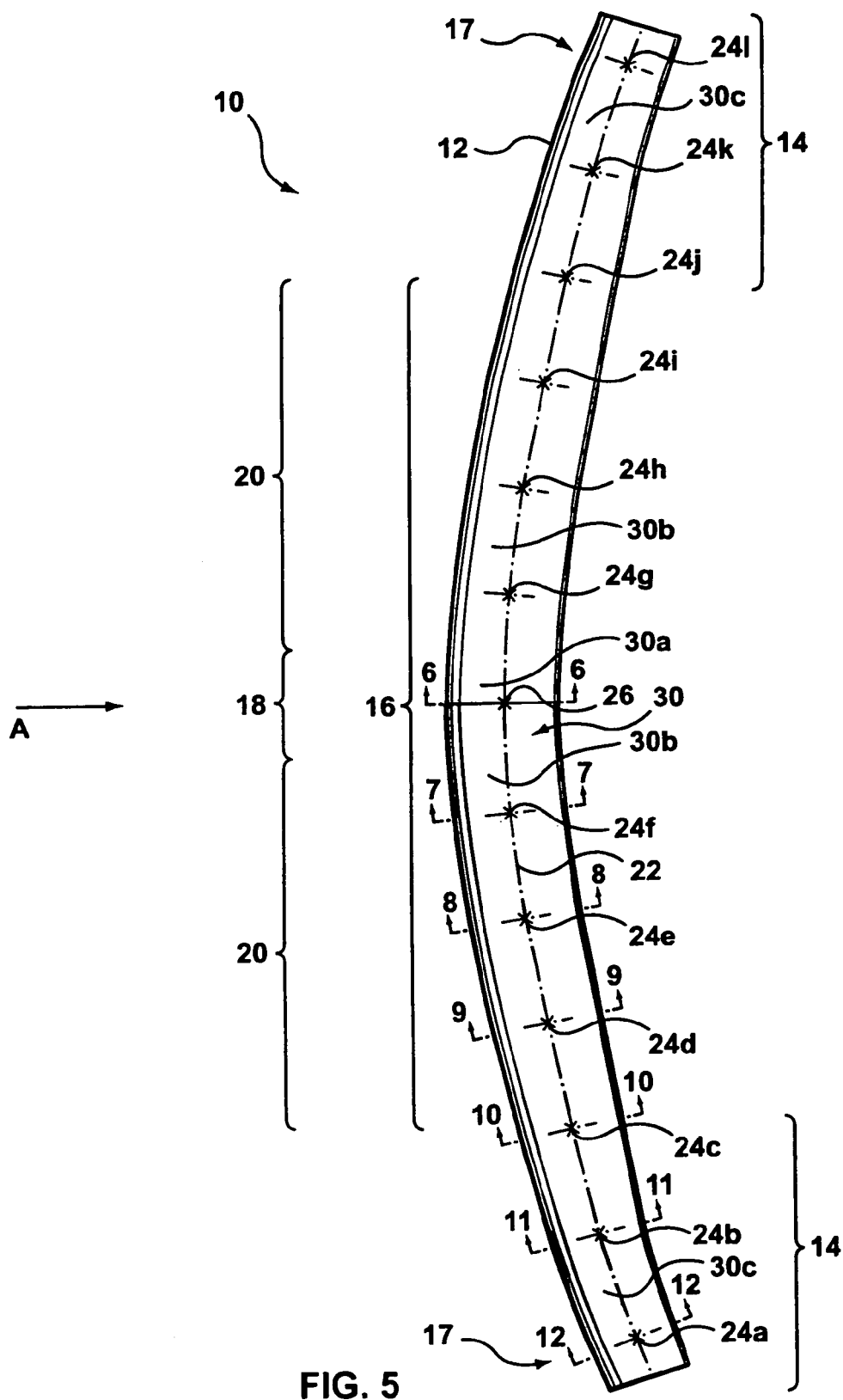
FIG. 5 is a top view of an embodiment of a bumper according to the present invention.

Referring to FIGS. 1 to 4, illustrated therein is a bumper 10 according to a preferred embodiment of the present invention. The bumper 10 comprises a hollow, longitudinally curved tubular beam 12 having two side rail mounting portions indicated generally at 14, and a front impact portion indicated generally at 16. The front impact portion 16 is disposed between the side rail mounting portions 14 and formed continuously therewith. When installed in a vehicle, the bumper 10 will be disposed behind and covered by a fascia 50 (as shown in FIG. 4). Preferably, the side rail mounting portions 14 are disposed at the ends 17 of the tubular beam 12.

The front impact portion 16 comprises an initial impact region 18 and two additional deforming regions 20. The initial impact region 18 is centrally disposed between the additional deforming regions 20, and will be the first part of the bumper to contact the barrier in the event of a front impact, although it will do so indirectly, as it will be behind the fascia 50. The additional deforming regions 20 are disposed between the side rail mounting portions 14 and the initial impact region 18, and will deform and absorb energy as the vehicle continues to move forward during the impact, until all the energy is absorbed and the vehicle comes to a stop.

The bumper 10 is preferably formed by a hydroforming process, preferably from a round welded steel tube. Still more preferably, the welded steel tube is made by electric resistance welding (ERW). The tube is preferably composed of ultra high strength steel (UHSS), and in a particular embodiment, the tube has a 100 mm outer diameter and a thickness of 1.0 to 2.0 mm. The tube is placed in a die used for hydroforming, being bent to fit if required, and then hydroformed into the shape described above. The hydroforming process is described in more detail below.

Referring now to FIG. 5, the bumper 10 has a notional centroid path 22, wherein the notional centroid path 22 is defined as a path upon which any center point 24 of a vertical cross section taken at any position on the bumper will lie. Such center points of vertical cross sections are illustrated by exemplary center points 24a to 24l and overall center point 26, which are spaced 0.1 meters apart. The front impact portion 16 is centered around the overall center point 26 of the notional centroid path 22.

The bumper 10 is preferably longitudinally symmetrical along the notional centroid path 22, in that the two halves of the bumper 10 extending longitudinally along the notional centroid path 22 from the center point 26 are mirror images of each other. It will be appreciated that the individual vertical cross sections of the bumper are not symmetrical.

In the particular embodiment illustrated in the figures, and as can be best seen in FIG. 5, the front impact portion 16 is approximately 0.8 meters in length, wherein length is measured along the notional centroid path 22. In the particular embodiment shown, the initial impact region 18 is approximately 0.1 meters in length, and each of the additional deforming regions 20 are approximately 0.35 meters in length, wherein length is measured along the notional centroid path 22. Of course, one skilled in the art will realize that the above dimensions are merely representative of a single preferred embodiment, and that numerous other embodiments having different dimensions will still fall within the scope of the present invention. Such adaptation of dimensions may be necessary, for example, to adapt the bumper 10 to vehicles of various sizes and types.

As can be seen in FIG. 5 and as was described above, the bumper 10 is preferably longitudinally symmetrical. FIG. 5 shows the locations of cross sections of the bumper 10 taken at 0.1 meter intervals. Because the bumper 10 is longitudinally symmetrical, representative cross sections are taken along one longitudinal half of the bumper 10. The cross sections are vertical cross sections passing through center points 24a to 24f and overall center point 26, and are perpendicular to the notional centroid path at the point of intersection. The cross sections are shown in FIGS. 6 to 12 to illustrate the shape of the bumper 10. FIG. 13 shows the shape of the open end of the bumper 10. FIGS. 6 to 10 are cross-sections of one half of the symmetrical front impact portion 16, with FIG. 6 being a cross-section through the overall center point 26 and showing the shape of a preferred embodiment of the initial impact region, and FIGS. 7 to 10 showing the shape of a preferred embodiment of the additional deforming regions 20.

FIGS. 11 to 13 show the shape of a preferred embodiment of the side rail mounting portions 14. The shape and configuration of the side rail mounting portions 14 is dictated in large part by the layout of the vehicle to which the bumper 10 is to be attached, such as the position of the side rails and the shape of the fascia. Additionally, the side rail mounting portions 14 will have their own performance requirements, for example in a 30-degree angle crash, and their shape will be influenced by the need to meet these requirements as well.

In the initial impact region 18 (FIG. 6) the top surface 30 is denoted by 30a, and the bottom surface 32 is denoted by 32a. In the additional deforming regions 20 (FIGS. 7 to 10) the top surface 30 is denoted by 30b, and the bottom surface 32 is denoted by 32b. The side rail mounting portions 14 (FIGS. 11 to 13) of the bumper 10 have top and bottom surfaces 30c and 32c, respectively.

In a preferred embodiment of the bumper 10, the front surface 41 has an upper protrusion 42 and a lower protrusion 44 extending along its length so as to define a stiffening channel 45 therebetween. The stiffening channel 45 preferably extends along at least the front impact portion 16 of the front surface 41. It is believed that the stiffening channel 45 increases the stiffness of the front surface 41 and thereby prevents undesirable buckling therein upon impact.

It is also preferred that the rear surface 43 has an upper curved edge 46 linking the rear surface 43 to the top surface 30, and a lower curved edge 47 linking the rear surface 43 to the bottom surface 32. Preferably, the upper and lower curved edges 46, 47 of the rear surface extend along the entire length of the bumper 10. In the initial impact region 18 (FIG. 6), the upper curved edge 46 is denoted by 46a, and the lower curved edge 47 is denoted by 47a. In the additional deforming regions 20 (FIGS. 7 to 10) the upper curved edge 46 is denoted by 46b, and the lower curved edge 47 is denoted by 47b. The side rail mounting portions 14 (FIGS. 11 to 13) of the bumper 10 have upper curved edge 46c and lower curved edge 47c. The side rail mounting portions 14 also have an indent 49 defined on the rear surface 43. Indent 49 may be used to "absorb" material to reduce the cross sectional area of the side rail mounting portions 14, to assist in meeting layout requirements.

Now referring in particular to FIG. 6, it can be seen that the top surface 30a and the bottom surface 32a of the initial impact region 18 are generally flat. It has been observed that upon a frontal impact with a barrier, the top and bottom surfaces 30a and 32a tend to buckle in a convex manner, so that the flat top and bottom surfaces 30a and 32a help to prevent this undesirable buckling in the initial impact region and thereby improve the performance of the bumper in a low speed frontal impact.

With reference now to FIGS. 7 to 10, it can be seen that the top surface 30b and the bottom surface 32b of the additional deforming regions 20 are generally convex, as illustrated by the convex areas 46 and 48. It has been found that in the additional deforming regions 20, the buckling mode upon a frontal impact tends to be concave. Accordingly, providing convex top and bottom surfaces 30b and 32b assists in resisting concave buckling, again improving the performance of the bumper 10.

Referring now to FIG. 3, it can be seen that the top surface 30a of the initial impact region 18 and the top surfaces 30b of the additional deforming regions 20 each comprise regions of a single continuous top surface 30 of the front impact portion 16. Similarly, the bottom surface 32a of the initial impact region 18 and the bottom surfaces 32b of the additional deforming regions 20 each comprise regions of a single continuous bottom surface 32 of the front impact portion 16. Preferably, the top and bottom surfaces 30 and 32 of the front impact portion 16 taper gradually from being generally flat in the initial impact region 18 to being generally convex in the additional deforming regions 20.

As was noted above, the area moment of inertia of a bumper also impacts its performance. In a preferred embodiment, the minimum area moment of inertia of the initial impact region 18 relative to the direction of impact shown by arrow A will be greater than the maximum area moment of inertia of each additional deforming region 20, also relative to the direction of impact A. Preferably, the area moment of inertia of the front impact portion 16 relative to the direction of impact has a maximum at a position corresponding to the overall center point 26 of the notional centroid path 22, and a minimum at the ends, located generally about the points 24j and 24c, of the additional deforming regions 20 adjacent the side rail mounting portions 14. In a particular preferred embodiment, the area moment of inertia of the front impact portion 16 generally continuously decreases from a maximum at the position corresponding to the center point 26 to a minimum at the two ends, located about 24j and 24c, of the additional deforming regions 20. It will be appreciated that the area moment of inertia need not decrease completely continuously from the front impact portion 16 through the additional deforming regions 20 to the ends 24j and 24c, and that there may be segments of the bumper in which the area moment of inertia is slightly higher than that of a more inwardly located segment. One skilled in the art will also appreciate that the generally continuous decrease in moment of inertia from the center point 26 to the ends 24j and 24c is for the front impact portion 16, and not the bumper 10 as a whole. Thus, the side rail mounting portions 14 may have segments having an area moment of inertia that is greater than that at the ends 24*j* and 24*c* of the front impact portion 16, and may even have portions having an area moment of inertia greater than the maximum area moment of inertia for the front impact portion 16. The particular area moment of inertia for a given part of the side rail mounting portions 14 will be affected by the performance requirements, for example in a 30-degree angle crash, and the layout requirements of the vehicle to which it is to be secured.

It is preferred to increase the stiffness of the initial impact region 18 and prevent buckling therein, while reducing the stiffness in the additional deforming regions 20 so as to permit a better strain distribution along the bumper beam. While a certain amount of stiffness is required in the initial impact region 18, if the additional deforming regions 20 are too stiff and therefore too resistant to bending, a higher stress concentration may result, making the bumper more susceptible to undesirable buckling. For this reason, the bumper 10 preferably has an area moment of inertia relative to the direction of impact A that is greatest in the initial impact region 18 and that decreases in the additional deforming regions 20, as described above. The particular values for the area moment of inertia at various positions on the bumper 10 will depend on the precise shape and configuration of the bumper 10. The optimal configuration will be influenced by the weight of the vehicle to which the bumper is to be affixed and the stroke and force requirements set by the manufacturer. One skilled in the art will appreciate that any number of configurations may be used to provide a bumper having the area moment of inertia characteristics described above, without departing from the scope of the present invention.

Referring now to FIG. 5, which is a top view of the bumper 10, it can be seen that the notional centroid path 22 has a non-constant longitudinal radius of curvature in the direction of impact A. By way of example only, a distinct change in the radius of curvature is visible at the points 24*b* and 24*k*, and more subtle changes are also visible along the notional centroid path 22. This non-constant radius of curvature is made possible by the use of a hydroforming process on the hollow tubular beam 12 of UHSS from which the bumper 10 is made.

With reference again to FIGS. 6 to 13, it can be seen that the upper protrusion 42 of the front surface 41 projects further outward than the lower protrusion 44. Now referring to FIG. 4, such a configuration is advantageous in permitting a bumper 10 to be aligned with a fascia 50 of a vehicle so that the exterior front surface 41 of the front impact portion 16 will be minimally spaced from the interior surface 52 of the fascia 50 when the bumper 10 and the fascia 50 are installed on a vehicle. In particular, where a fascia 50 slopes in a downwardly and inwardly direction relative to a vehicle on which it is installed, the use of an upper protrusion 42 that projects further than a corresponding lower protrusion 44 permits the bumper 10 to more closely follow the shape of the interior surface 52 of the fascia 50. This will reduce the distance traveled by the fascia 50 as it deforms in a very low speed crash, reducing the likelihood of damage to the fascia 50 from such a collision. For example, in gently bumping the car in front when parallel parking, the fascia 50 will not deform enough to crack or permanently dent before contacting the stiffer bumper 10, avoiding the need to replace or repair the fascia 50, or endure an unsightly crack or dent therein.

In each of FIGS. 6 to 13, a number of dimensions are indicated. In particular, each figure shows three horizontal depths denoted generally as $D_A$, $D_B$ and $D_C$, and three vertical heights denoted generally as $H_A$, $H_B$ and $H_C$. Each depth and height is also identified by the figure to which it corresponds, so that $D_{6A}$ is the depth $D_A$ corresponding to FIG. 6, $D_{7A}$ is the depth $D_A$ corresponding to FIG. 7, and so on. For ease of reference, "horizontal" refers to a direction parallel to the direction of impact A shown in FIG. 4 and FIG. 6, and "vertical" refers to a direction perpendicular to the direction of impact A.

Each height $H_{6A}$ to $H_{13A}$ is a vertical height of the bumper 10 at a position generally behind the stiffening channel 43, approximately between the position where the upper surface 30 begins to curve to become the upper protrusion 42 and the lower surface 32 begins to curve to become the lower protrusion 44; the height $H_{13A}$ passes through the edge of the stiffening channel 45. For the additional deforming regions 20 (FIGS. 7 to 10), each height $H_{7B}$ to $H_{10B}$ is a vertical height of the bumper 10 measured between the convex areas 46 and 48, while for the initial impact region 18 (FIG. 6), the height $H_{6B}$ is a vertical height of the bumper 10 at a position corresponding generally to the location of the convex areas 46 and 48 on the top and bottom surfaces 30*b*, 32*b* of the additional deforming regions 20. The heights $H_{11B}$ to $H_{13B}$ (FIGS. 11 to 13) are also vertical heights of the bumper 10 at a position corresponding generally to the location of the convex areas 46 and 48 of the additional deforming regions 20. Each height $H_C$ is a vertical height of the bumper 10 at a position immediately in front of the upper curved edge 46 and lower curved edge 47 of the rear surface 43.

Each depth $D_{6A}$ to $D_{13A}$ is a horizontal depth measured between the upper protrusion 42 and the rear surface 43. Each depth $D_{6B}$ to $D_{10B}$ is a horizontal depth measured between the stiffening channel 45 and the rear surface 43, while each depth $D_{11B}$ to $D_{13B}$ is a horizontal depth measured between the stiffening channel 45 and the rear indentation 49, which is part of the rear surface 43. Each depth $D_{6C}$ to $D_{13C}$ is a horizontal depth measured between the lower protrusion 44 and the rear surface 43.

All depths $D_A$, $D_B$ and $D_C$ and all heights $H_A$, $H_B$ and $H_C$ are measured relative to the exterior surface of the bumper 10. The table below sets out the relevant dimensions of a particular embodiment of the bumper 10, beginning at the center point 26 and moving outward at 0.1 meter increments along the notional centroid path 22. Measurements are rounded to the nearest tenth of a millimeter.

DIMENSIONS OF EXEMPLARY EMBODIMENT

| Increment from center (m) | 0.0 (Ctr.) | 0.1 | 0.2 | 0.3 | 0.4 | 0.5 | 0.6 | 0.7 |
|---|---|---|---|---|---|---|---|---|
| FIG. No. | 6 | 7 | 8 | 9 | 10 | 11 | 12 | 13 |
| $H_A$ (mm) | 75.8 | 74.5 | 73.2 | 75.8 | 82.4 | 87.1 | 89.5 | 90.5 |
| $H_B$ (mm) | 75.7 | 80.1 | 79.9 | 78.2 | 82.7 | 90.2 | 91.1 | 90.0 |
| $H_C$ (mm) | 70.2 | 70.3 | 68.6 | 70.6 | 78.3 | 86.2 | 88.1 | 88.5 |
| $D_A$ (mm) | 99.2 | 99.7 | 99.9 | 98.4 | 91.9 | 82.9 | 76.6 | 73.7 |
| $D_B$ (mm) | 89.5 | 87.4 | 86.3 | 87.2 | 81.5 | 67.1 | 54.3 | 47.0 |
| $D_C$ (mm) | 93.2 | 93.7 | 93.9 | 92.4 | 85.9 | 77.1 | 71.5 | 68.1 |

In the embodiment described above, the bumper 10 has a perimeter of approximately 319 mm. This perimeter is preferably substantially constant along the length of the bumper 10, although there may be minor variances due to slight deformation of the material during the hydroforming process.

It will be appreciated by one skilled in the art that the measurements given above are exemplary only, representing a single preferred embodiment, and that numerous other embodiments having different measurements will fall within the scope of the present invention as defined by the appended claims.

As indicated above, the bumper 10 is preferably formed by a hydroforming process. Hydroforming is well known in the art, and may be described briefly, and without limitation, as follows. A tubular blank may first be longitudinally bent, if necessary, into a shape approximating that of the desired final component while preserving a substantially circular cross section and substantially maintaining the original circumference. The blank is then placed in a two-part sectional die, and the die halves are brought together. Both ends of the blank are sealed, and a fluid is injected through one of the seals so as to apply sufficient pressure to the interior of the blank to cause its external surfaces to conform to the interior surface of the die cavity. The pressure may then be released, the fluid withdrawn, and the die halves separated so that the finished part may be removed. For ease of reference, the hydroforming process is described in U.S. Pat. Nos. 4,567,743, RE33,990 and 4,829,803, all to Cudini.

In order to hydroform ultra high strength steel (UHSS), special procedures are required to avoid fracture of the steel tube. Due to the lower elongation of UHSS, UHSS tubes tend to fracture as a result of the cold work introduced when attempts are made to deform them in the absence of internal pressure. In particular, when a UHSS tube is deformed between two die halves without internal pressure, or if the internal pressure is insufficient, the tube will assume a biconcave cross sectional shape, and will tend to fracture in the high-stress concave areas. As a result, initial unpressurized deformation should be avoided. At the same time, however, if the pressure is too high, the tube wall will bulge into the open areas between the die halves, or may burst, in both cases resulting in a defect.

Figure 14A:
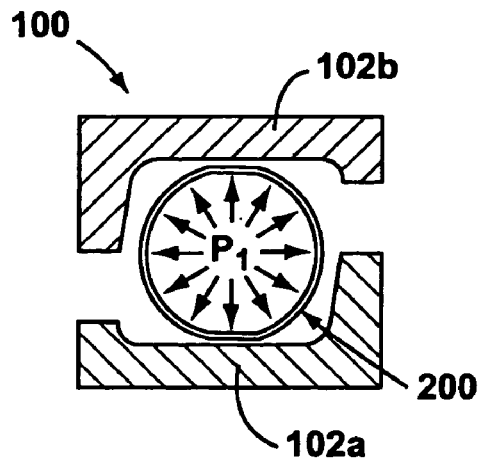
FIG. 14a is a cross sectional view of a hydroforming die in an open position and having a pressurized circular UHSS tube disposed therein.
Figure 14B:
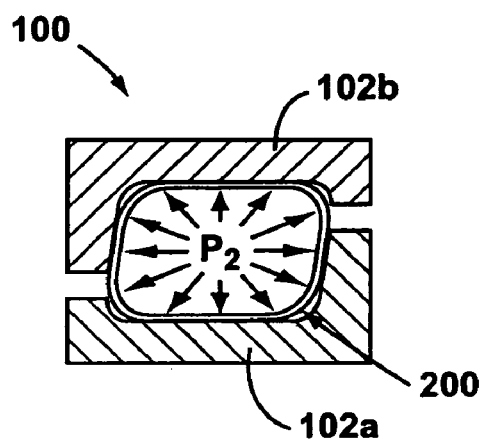
FIG. 14b is a cross sectional view of a hydroforming die in a partially closed position and having a pressurized, partly deformed UHSS tube disposed therein.
Figure 14C:
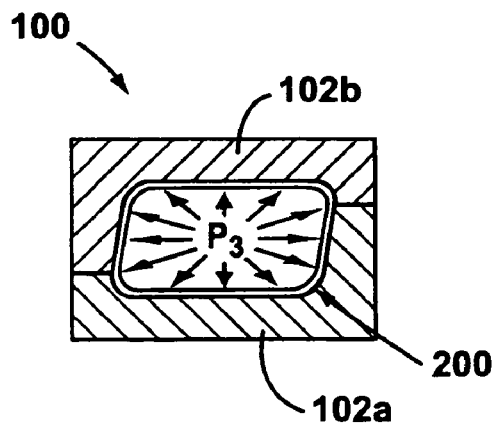
FIG. 14c is a cross sectional view of a hydroforming die in a fully closed position and having a pressurized, fully deformed UHSS tube disposed therein.

FIGS. 14a, 14b and 14c show a preferred process for hydroforming a UHSS tube. In particular, a die 100 comprising first and second die halves 102a and 102b, respectively, is used to deform a UHSS tube 200. The tube 200 should be pressurized at or before the moment it is contacted by the second die half 102b, i.e. at or before the moment it begins to undergo compression. This is shown in FIG. 14a, with the initial pressure indicated as $P_1$. The pressure in the tube 200 is then permitted to gradually increase as the die 100 is closed, as shown in FIG. 14b where there is an intermediate pressure $P_2$, $P_2$ being greater than $P_1$. The pressure continues to gradually increase toward a final pressure $P_3$ as the die 100 is closed, so that once the die 100 is fully closed, as shown in FIG. 14c, the pressure in the tube 200 will be at the final pressure $P_3$ and the tube 200 will have assumed the desired shape and the forming process will be complete. Of course, $P_3$ is greater than both $P_2$ and $P_1$.

As the die 100 is closed, the pressure in the tube 200 will increase. This increase in pressure is due solely to the change in shape of the tube 200 as the die 100 closes. Specifically, the internal volume of the tube 200 has a maximum value when the tube 200 has a circular cross section as shown in FIG. 14a, and decreases from this maximum as the tube is deformed. If the quantity of fluid contained within the tube 200 remains constant, or if the quantity of fluid decreases at a rate less than the rate of decrease in the internal volume of the tube 200, the pressure within the tube 200 will increase. In order to control the final pressure $P_3$ as well as the increase in pressure from $P_1$ through $P_2$ to $P_3$ so that it occurs at the desired gradual rate, it is preferred to use a controlled relief valve that can vary the rate of fluid outflow from the tube 200. To achieve the desired increase in pressure, the rate of fluid outflow through the relief valve is reduced as the die 100 is closed. Alternatively, it may be possible to permit the pressure to increase at the desired rate by using a relief valve having a fixed outflow rate and varying the rate at which the die halves 102a, 102b are brought together.

By providing an appropriate initial pressure $P_1$ and permitting the pressure to gradually increase to the final pressure $P_3$ as the die 100 closes, the tube 200 will be made to flow directly into the die shape as the die 100 closes onto the tube 200. It is to be appreciated that the final pressure $P_3$ is reached at the moment the die 100 is closed, and there is no further increase in pressure required to complete the deformation process once the die 100 is closed. Optionally, however, the pressure in the tube 200 may be further increased after the die 100 is closed, for example to provide internal support for installing articles. Such holes are typically punched using punches that are mounted in the die 100 (not shown) and advance into the die cavity, and therefore the tube 200, after the forming is complete and while the tube 200 is still pressurized.

The appropriate initial pressure $P_1$, final pressure $P_3$ and the rate of increase in pressure will depend on the size of the tube being formed and the thickness of the material used. In the particular embodiment described herein, namely a 100 mm diameter UHSS tube 200 having a thickness of 1.0 to 2.0 mm, the initial pressure $P_1$ in the tube 200 should be approximately 1000 to 2000 psi and the final pressure $P_3$ should be about 5000 to 6000 psi. One skilled in the art will appreciate that when a tube 200 has a thickness closer to 1.0 mm, the initial pressure $P_1$ should be closer to 1000 psi and the final pressure $P_3$ should be closer to 5000 psi. Similarly, when a tube 200 has a thickness closer to 2.0 mm, the initial pressure $P_1$ should be closer to 2000 psi and the final pressure $P_3$ should be closer to 6000 psi. Again referring to the particular embodiment described herein, the die halves 102a and 102b are approximately 53 mm apart at the point of initial contact with the tube 200, shown in FIG. 14a, and move to a fully closed position, shown in FIG. 14c, in approximately 1 to 2 seconds.

The pressure within the tube 200 results in a stress, known as hoop stress, being applied to the tube 200. It should be stressed that in the above method, the hoop stress should at all times be below the yield limit of the UHSS being hydroformed, as the objective is to bend the material of the tube, rather than elongate it.

Preferably, when forming the bumper 10, any necessary pre-bending of the tube is carried out using the mandrel method with a rotary draw bender. Alternatively, a roll bender may be used, although this may reduce the circumference of the tube, requiring design allowance to be made for the reduced circumference.

It will be appreciated that many other variations and modifications may be made to the embodiments and process described above without departing from the scope of the present invention, and all such variations and modifications are intended to be encompassed within the scope of the appended claims.

The invention claimed is:

1. A bumper for a vehicle, comprising a longitudinally curved hollow tubular beam having two side rail mounting portions and a front impact portion disposed between the side rail mounting portions and formed continuously therewith, the front impact portion comprising an initial impact region and two additional deforming regions, the initial impact region being longitudinally disposed between the additional deforming regions, wherein the initial impact region has a top surface and a bottom surface, the top surface and bottom surface of the initial impact region being generally flat, and wherein the additional deforming regions each have top and bottom surfaces, the top surfaces and bottom surfaces of the additional deforming regions being generally convex.

2. The bumper of claim 1, wherein the top surface of the initial impact region and the top surfaces of the additional deforming regions each comprise regions of a single continuous top surface of the front impact portion, and wherein the bottom surface of the initial impact region and the bottom surfaces of the additional deforming regions each comprise regions of a single continuous bottom surface of the front impact portion, and wherein the top and bottom surfaces of the front impact portion taper gradually from being generally flat in the initial impact region to being generally convex in the additional deforming regions.

3. The bumper of claim 2, wherein the bumper has a front surface and the front surface comprises a stiffening channel extending along at least the front impact portion of the front surface.

4. The bumper of claim 3, wherein the bumper has a direction of impact and the initial impact region has a minimum area moment of inertia relative to the direction of impact, and the additional deforming regions each have a maximum area moment of inertia relative to the direction of impact, and wherein the minimum area moment of inertia of the initial impact region is greater than the maximum area moment of inertia of each additional deforming region.

5. The bumper of claim 3, wherein the bumper has a direction of impact and the tubular beam has a notional centroid path therethrough, the notional centroid path being symmetrical and having a center point, and wherein the front impact portion has an area moment of inertia relative to the direction of impact having a maximum at a position corresponding to the center point and a minimum at ends of the additional deforming regions adjacent the side rail mounting portions, and wherein the area moment of inertia of the front impact portion generally continuously decreases from the position corresponding to the center point to the two ends of the additional deforming regions.

6. The bumper of claim 5, wherein the beam is composed of ultra high strength steel.

7. The bumper of claim 6, wherein the bumper is formed by a hydroforming process.

8. The bumper of claim 6, wherein the beam has an exterior surface having a substantially constant perimeter.

9. The bumper of claim 1, wherein the bumper has a direction of impact, and wherein the tubular beam has a notional centroid path therethrough, the notional centroid path having a non-constant radius of curvature in the direction of impact.

10. A bumper for a vehicle, comprising a longitudinally symmetrical, longitudinally curved hollow tubular beam having first and second ends, the tubular beam having a top surface and a bottom surface, the top surface and the bottom surface each having a generally flat region disposed in a central portion of the bumper, relative to the first and second ends, the top surface and the bottom surface each having a first generally convex region longitudinally disposed between the first end and the central portion, and a second generally convex region longitudinally disposed between the second end and the central portion.

11. The bumper of claim 10, wherein the bumper has a front surface and the front surface comprises a stiffening channel extending along at least a portion of the front surface corresponding in position to the generally flat region and the first and second generally convex regions.

12. The bumper of claim 10 wherein the first and second generally convex regions on the top surface gradually taper into the generally flat region on the top surface, and wherein the first and second generally convex regions on the bottom surface gradually taper into the generally flat region on the bottom surface.

13. A bumper for a vehicle, comprising a longitudinally curved hollow tubular beam having two side rail mounting portions and a front impact portion disposed between the side rail mounting portions and formed continuously therewith, wherein the bumper has a direction of impact and the tubular beam has a notional centroid path therethrough, the notional centroid path being symmetrical and having a center point, and wherein the front impact portion has an area moment of inertia relative to the direction of impact having a maximum at a position corresponding to the center point and a minimum at ends of the additional deforming regions adjacent the side rail mounting portions, and wherein the area moment of inertia of the front impact portion generally continuously decreases from the position corresponding to the center point to the two ends of the additional deforming regions.

14. The bumper of claim 13, wherein the bumper has a front surface and the front surface comprises a stiffening channel extending along at least a portion of the front surface corresponding in position to the front impact portion.

15. A bumper for a vehicle, comprising a longitudinally curved hollow tubular beam having two side rail mounting portions and a front impact portion disposed between the side rail mounting portions and formed continuously therewith, the front impact portion comprising a central initial impact region and two additional deforming regions adjacent the initial impact region, the initial impact region being longitudinally disposed between the additional deforming regions, wherein the initial impact region has a top surface and a bottom surface, the top surface and bottom surface of the initial impact region being generally flat, and wherein the additional deforming regions each have top and bottom surfaces, the top surfaces and bottom surfaces of the additional deforming regions being generally convex.

16. The bumper of claim 15, wherein the top surface of the initial impact region and the top surfaces of the additional deforming regions each comprise regions of a single continuous top surface of the front impact portion, and wherein the bottom surface of the initial impact region and the bottom surfaces of the additional deforming regions each comprise regions of a single continuous bottom surface of the front impact portion, and wherein the top and bottom surfaces of the front impact portion taper gradually from being generally flat in the initial impact region to being generally convex in the additional deforming regions.

17. The bumper of claim 16, wherein the bumper has a front surface and the front surface comprises a stiffening channel extending along at least the front impact portion of the front surface.

18. The bumper of claim 17, wherein the bumper has a direction of impact and the initial impact region has a minimum area moment of inertia relative to the direction of impact, and the additional deforming regions each have a maximum area moment of inertia relative to the direction of impact, and wherein the minimum area moment of inertia of the initial impact region is greater than the maximum area moment of inertia of each additional deforming region.

19. The bumper of claim 17, wherein the bumper has a direction of impact and the tubular beam has a notional centroid path therethrough, the notional centroid path being symmetrical and having a center point, and wherein the front impact portion has an area moment of inertia relative to the direction of impact having a maximum at a position corresponding to the center point and a minimum at ends of the additional deforming regions adjacent the side rail mounting portions, and wherein the area moment of inertia of the front impact portion generally continuously decreases from the position corresponding to the center point to the two ends of the additional deforming regions.

20. The bumper of claim 19, wherein the beam is composed of ultra high strength steel.

21. The bumper of claim 20, wherein the bumper is formed by a hydroforming process.

22. The bumper of claim 21, wherein the beam has an exterior surface having a substantially constant perimeter.

23. The bumper of claim 15, wherein the bumper has a direction of impact, and wherein the tubular beam has a notional centroid path therethrough, the notional centroid path having a non-constant radius of curvature in the direction of impact.

24. A bumper for a vehicle, comprising a longitudinally symmetrical, longitudinally curved hollow tubular beam having first and second ends, the tubular beam having a top surface and a bottom surface, the top surface and the bottom surface each having a generally flat region disposed in a central portion of the bumper, relative to the first and second ends, the top surface and the bottom surface each having a first generally convex region longitudinally disposed between the first end and the central portion, and a second generally convex region longitudinally disposed between the second end and the central portion, the first convex region and the second convex region being adjacent the central portion.

25. The bumper of claim 24, wherein the bumper has a front surface and the front surface comprises a stiffening channel extending along at least a portion of the front surface corresponding in position to the generally flat region and the first and second generally convex regions.

26. The bumper of claim 24, wherein the first and second generally convex regions on the top surface gradually taper into the generally flat region on the top surface, and wherein the first and second generally convex regions on the bottom surface gradually taper into the generally flat region on the bottom surface.

* * * * *